L. SHAW.
AUTOMATIC DEVICE FOR OPERATING WATER SEALS FOR GAS MAINS.
APPLICATION FILED JULY 27, 1908.
906,312. Patented Dec. 8, 1908.
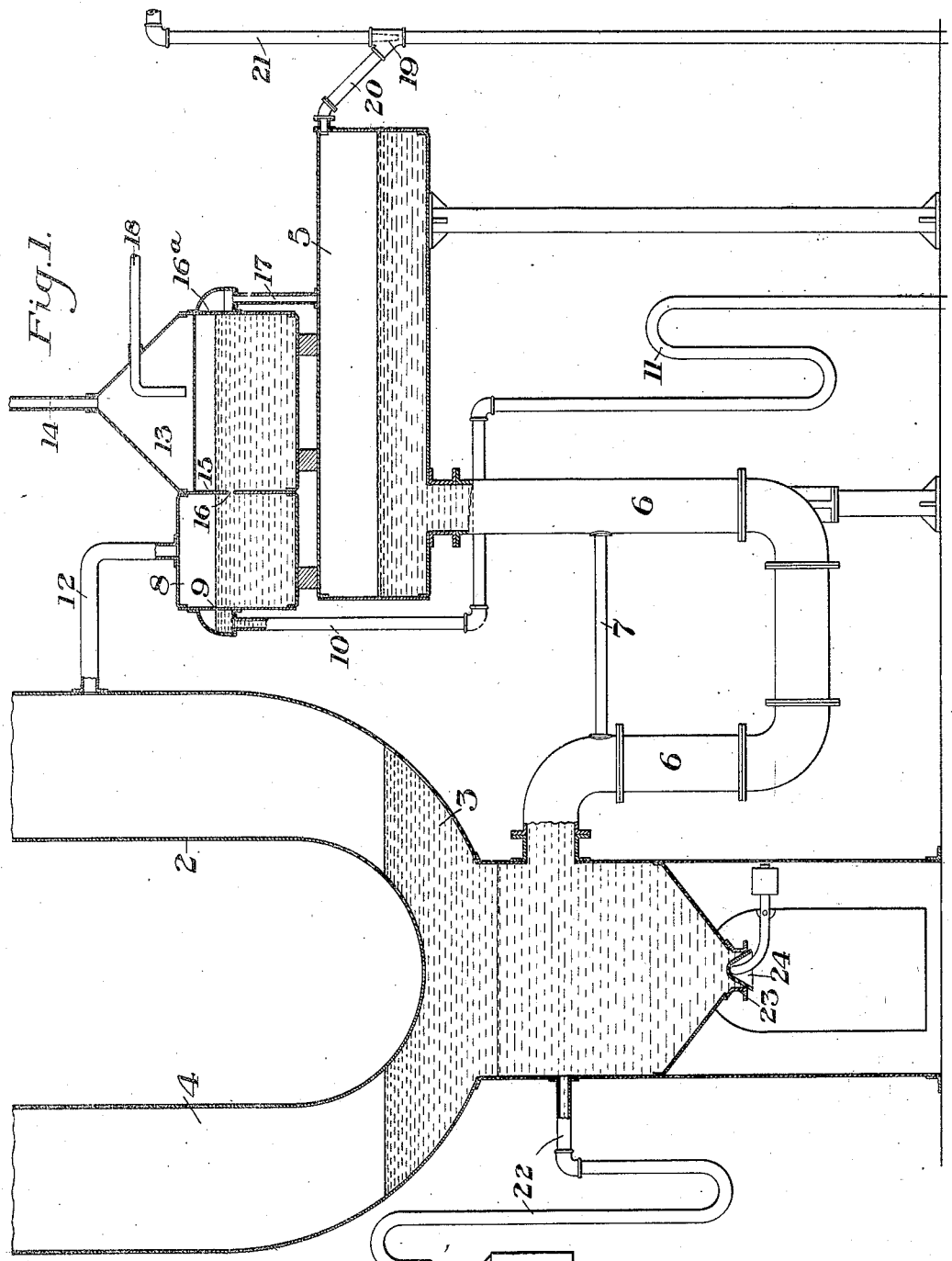

UNITED STATES PATENT OFFICE.

LEONARD SHAW, OF CHICAGO, ILLINOIS.

AUTOMATIC DEVICE FOR OPERATING WATER SEALS FOR GAS-MAINS.

No. 906,312.   Specification of Letters Patent.   Patented Dec. 8, 1908.

Application filed July 27, 1908. Serial No. 445,473.

*To all whom it may concern:*

Be it known that I, LEONARD SHAW, of Chicago, Cook county, Illinois, have invented a new and useful Automatic Device for Operating Water Seals for Gas-Mains, of which the following is a full, clear, and exact description, reference being had to the accompanying drawings, forming part of this specification, in which—

Figure 1 is a sectional elevation of one form of apparatus embodying my invention; and Fig. 2 is a detail view showing the automatic vent pipe.

My invention is primarily designed to provide means for automatically effecting a water seal in the gas main of a gas cleaning plant whenever the gas pressure in the plant falls below a predetermined minimum, for the purpose of stopping the flow of gas and preventing the drawing of air into the plant by the gas washer, which would produce an explosive mixture in the plant and cause an explosion in the event of this mixture becoming ignited from any cause. The invention is, however, applicable to various purposes where the automatic control of the flow of gas can be obtained by variation of pressure in the system.

The precise nature of my invention will be best understood by reference to the accompanying drawings, in which I have shown one embodiment thereof, and which will now be described, it being premised, however, that the invention is susceptible of other embodiments, and it may be variously changed in its details of construction and arrangement within the scope of the appended claims.

In these drawings, the numeral 2 designates the inlet portion of a gas main leading to a water-sealing chamber 3, and 4 is the gas outlet pipe leading from said chamber.

5 is a water tank, which is connected with the water-sealing chamber 3 by means of the bent pipe 6.

7 is a vent pipe which connects the two arms of the bent pipe 6 for the purpose hereinafter described.

8 designates a closed relay tank, which is shown as supported above the water tank 5, and which is provided with an overflow opening at 9 connecting with a waste pipe 10 having a sealing bend or trap 11. The upper portion of the relay tank 9 is connected with the gas inlet pipe 2 by a pipe 12, whereby the water in the tank 8 will be subject to the pressure of the gas inlet 2.

13 is a second relay tank, which has a vent pipe 14 opening to the atmosphere, and which is separated from the relay tank 8 by an intermediate wall 15 having therein a slot 16 by means of which communication between the two relay tanks is effected. At its opposite end the tank 13 has an overflow opening 16ª, which communicates with a vent pipe 17, which opens at its lower end into the upper portion of the water tank 5. As shown in Fig. 2, the overflow opening 16ª extends across a considerable portion of the width of the tank 13, so as to provide for a sufficient discharge of water to keep the vent pipe 17 normally filled when the water in the tank 13 is raised to such a level as to cause its overflow by the pressure of the gas in the closed tank 8.

is a water supply pipe, which is arranged to constantly discharge a small stream of water into the tank 13.

19 is a jet siphon, which is connected by an exhaust pipe 20 to the upper portion of the water tank 5, and which receives a constant supply of water under high pressure through a pipe 21.

22 is a trapped discharge pipe for the water-sealing chamber 3. This chamber is provided at its lower end with the usual discharge opening 23 provided with a closure 24.

The operation is as follows:—The jet siphon 19 is in constant operation, and so arranged that as long as the vent pipe 17 is kept filled with water by the overflow from the relay tank 13 it will maintain a partial vacuum in the main tank 5. This will act to raise the water level in the main tank and hold it there as long as the vent pipe is kept filled. This causes a sufficient lowering of the water in the sealing chamber 3 to prevent a seal being formed. When the gas pressure in the closed relay tank 8 falls to or below the point at which the water seal is to operate, the water in the open relay tank 13 ceases to flow through the overflow opening 16ª and air is drawn through the vent pipe 17 from the tank 13. The admission of air in this manner to the tank 5 breaks the vacuum in the main tank, and the water level in the sealing chamber 3 rises to a sufficient height to effect the seal. As soon as the required pressure in the gas main is restored, the water in the open relay tank again flows out of the overflow opening 16ª and fills the vent pipe 17, so that the jet siphon again exhausts the air in the main tank, which raises the water level therein, causing the water in the sealing chamber 3 to back up into the main tank and thus break the seal. The vent pipe 7 prevents the bent pipe 6 from acting as a siphon to draw the water out of the sealing chamber.

By raising or lowering the overflow opening from the relay tank 8, the level of water in the open relay tank 13 may be controlled so as to require a corresponding pressure in the closed tank (above or below atmospheric pressure), to bring the water to the overflow edge of the open tank. The relative heights of the overflow edges in the two relay tanks will be determined by the pressure at which the gas main water seal is desired to be filled.

My invention provides a simple and effective means by which a variation in the pressure in the system may be utilized to automatically control the flow of gas. While in the system shown, the arrangement operates upon a diminution of pressure in the gas main, it is obvious that it may be made to operate to equal advantage upon a predetermined maximum of pressure. In such cases the overflow openings of the relay tanks are simply reversed relatively to each other, the vent pipe 17 being connected to the tank 8 instead of to the tank 13.

The arrangement may also be made to operate by a difference of pressure in different parts of the system, by making the tank 13 a closed tank and connecting it with one side of the system so that the relative levels of water in the two relay tanks will depend upon the difference in pressure in different parts of the system.

My invention is also capable of various other modifications. Thus, the arrangement of the several tanks, the form of the jet siphon, and the manner of connecting the parts, which, as shown in the drawings, is largely diagrammatic, may be varied in each case according to the particular conditions and requirements.

I claim:—

1. In apparatus of the character described, a gas conduit or main having a water-sealing compartment, a water supply reservoir, a conduit connecting the water-supply reservoir with the water sealing compartment, and means controlled by variations of gas pressure for causing the water to flow from the reservoir to the compartment under certain condition of gas pressure, and from the compartment back to the reservoir under other conditions of gas pressure; substantially as described.

2. In apparatus of the character described, a gas conduit or main having a water-sealing compartment, a main supply tank connected thereto, means acting to create a partial vacuum in said tank, and means controlled by variations of gas pressure for controlling the action of the vacuum-creating means; substantially as described.

3. In apparatus of the character described, a gas conduit or main having a water-sealing compartment, a main supply tank connected thereto, means acting to create a partial vacuum in the water-supply tank, two communicating relay tanks, one of which has a discharge pipe communicating with the water-supply tank, and means controlled by variations of gas pressure for determining the relative levels of water in the relay tanks; substantially as described.

4. In apparatus of the character described, a gas conduit or main having a water-sealing compartment, a main supply tank connected to said compartment, means acting to create a vacuum in said tank, two communicating relay tanks, one of said tanks having a connection with the gas conduit at the inlet side of the water-sealing compartment, and the other of said tanks having an overflow opening communicating with a discharge pipe leading to the main tank; substantially as described.

5. In apparatus of the character described, a gas conduit or main having a water-sealing compartment, a main supply tank connected thereto by a bent pipe, a siphon device connected with the main tank, two communicating relay tanks having each an overflow opening, the overflow opening of one tank connected with a waste pipe, and the overflow opening of the other relay tank connected with the main tank, and a connection between one of the relay tanks and the gas conduit or main at the inlet side of the water-sealing compartment; substantially as described.

6. In apparatus of the character described, a gas conduit or main having a water sealing compartment, a supply reservoir therefor, a conduit connecting the reservoir and compartment, and means controlled by variations of gas pressure for controlling the air pressure in said reservoir, said reservoir and compartment being at such relative levels that the water will flow in one direction or the other through said conduit according to the air pressure in the reservoir, substantially as described.

In testimony whereof, I have hereunto set my hand.

LEONARD SHAW.

Witnesses:
A. I. KRAFFT,
WM. S. PARKS.